Figure 3:
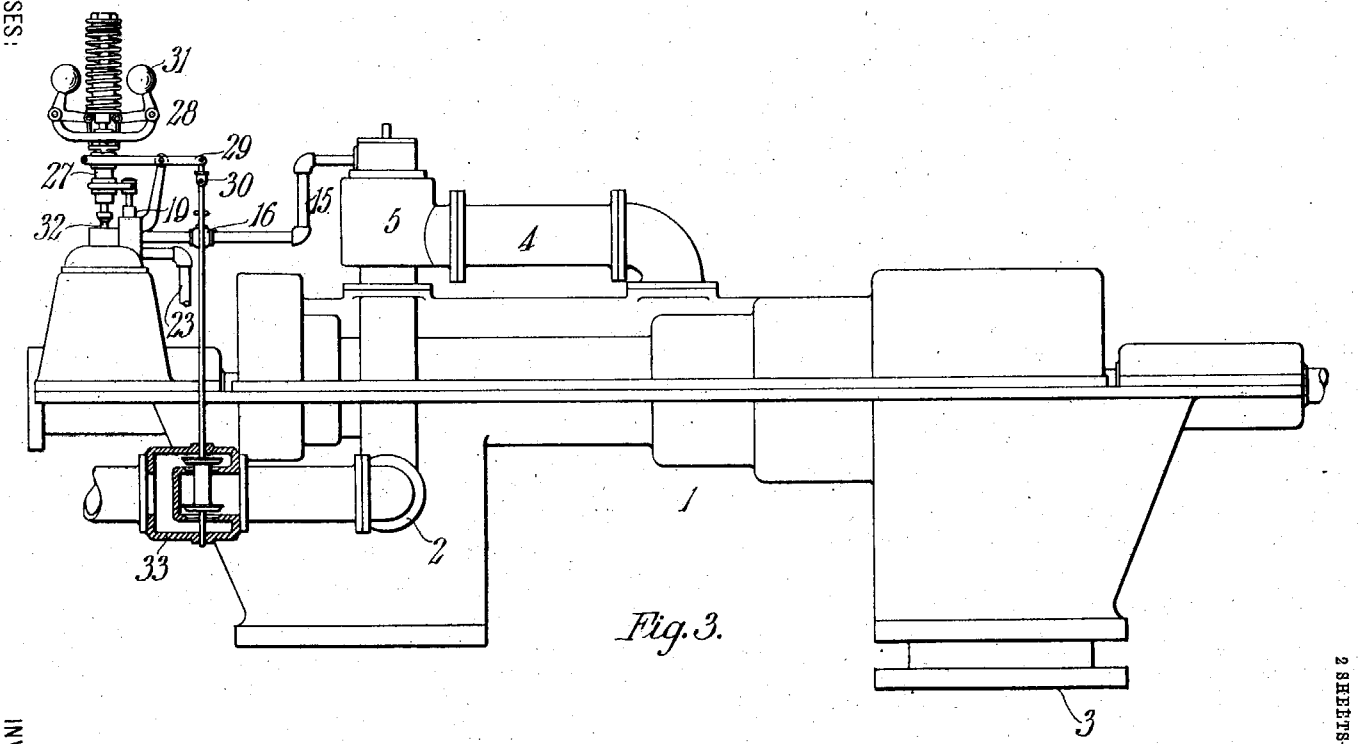

No. 12,848. REISSUED SEPT. 8, 1908.
F. HODGKINSON.
VALVE CONTROLLING MECHANISM.
APPLICATION FILED OCT. 4, 1904.
2 SHEETS—SHEET 1.
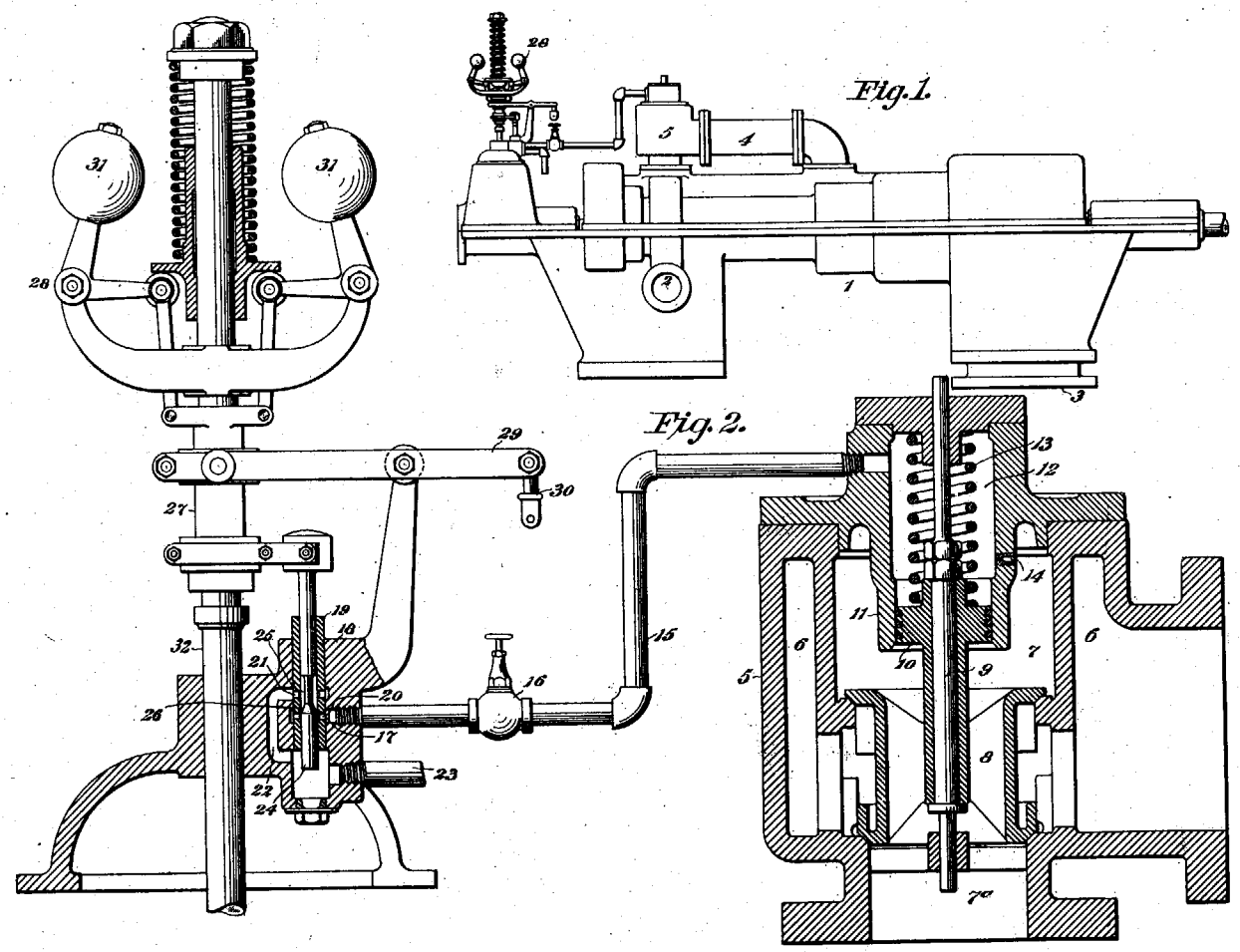
Witnesses
G. L. Ryder.
Jno. F. Gunn.
Inventor
Francis Hodgkinson
By his Attorney Wesley G. Carr
THE NORRIS PETERS CO., WASHINGTON, D. C.

No. 12,848. REISSUED SEPT. 8, 1908.

F. HODGKINSON.

VALVE CONTROLLING MECHANISM.

APPLICATION FILED OCT. 4, 1904.

2 SHEETS—SHEET 2.

WITNESSES:

C. L. Belcher

J. C. Morse

INVENTOR

Francis Hodgkinson

BY Wesley G. Carr

ATTORNEY

THE NORRIS PETERS CO., WASHINGTON, D. C.

UNITED STATES PATENT OFFICE.

FRANCIS HODGKINSON, OF EDGEWOOD PARK, PENNSYLVANIA, ASSIGNOR TO THE WESTINGHOUSE MACHINE COMPANY, A CORPORATION OF PENNSYLVANIA.

VALVE-CONTROLLING MECHANISM.

No. 12,848. Specification of Reissued Letters Patent. Reissued Sept. 8, 1908.

Original No. 751,510, dated February 9, 1904, Serial No. 108,799. Application for reissue filed October 4, 1904. Serial No. 227,169.

*To all whom it may concern:*

Be it known that I, FRANCIS HODGKINSON, a subject of the King of Great Britain and Ireland, residing at Edgewood Park, in the county of Allegheny and State of Pennsylvania, have invented a new and useful Improvement in Valve-Controlling Mechanism, of which the following is a specification.

My invention relates to valves and valve-controlling mechanism for regulating or controlling a supply of fluid to a steam-engine or other machine or apparatus; and it has for its object to provide a device of this character which shall be comparatively simple in construction and effective and certain in operation.

My invention is primarily designed for use in connection with steam-turbines, and it will be illustrated and described in connection with engines of this character, but without intention of limiting it, so far as the structural features of the valve and its operating and controlling mechanism are concerned, to this specific relation.

It has heretofore been customary to provide fluid-pressure turbines of the multicellular or Parsons type with what has been termed "by-pass valves," which serve to take steam from the high-pressure part of the engine, usually at a point after it has passed the speed-regulating valve controlled by the governor and before entering the first set of guide-blades of the turbine, and supplying such high-pressure steam directly to a point in the turbine where the steam is normally at a lower pressure and of greater volume, for the purpose of insuring the development of a greater amount of power under certain conditions of operation. While such increase of power is obtained at some sacrifice of economy, the exigencies of operation of power plants render it occasionally desirable to obtain an increase of power even at a sacrifice of economy.

Valves for the use above indicated have heretofore been operated by hand after the manner of an ordinary throttle-valve, as occasion demanded, and it is one of the objects of my present invention to provide means whereby such a valve may automatically open when the load on the engine exceeds a normal maximum and will automatically close when the load returns to the normal.

In the accompanying drawings, Figure 1 is a side elevation of a steam-turbine provided with my improvement; Fig. 2 is a vertical sectional view, on an enlarged scale, of the automatic valve and its operating means; and Fig. 3 is a figure similar in all respects to Fig. 1, except that the speed regulating valve is included.

The turbine 1, which is shown in outline, receives steam through the inlet-port 2 and exhausts through the port 3, high-pressure steam being also supplied to an intermediate point from any suitable point or source through a pipe or other conduit 4 by means of my valve mechanism, to be hereinafter described, when the load on the engine exceeds the normal.

The valve casing or chamber 5 is provided with an outer chamber 6, which is in open communication with the pipe 4, and with an inner chamber 7, which is in open communication with an inlet-port $7^a$ through a hollow valve 8. The valve 8 when seated cuts off communication between the outer chamber 6 and both the inner chamber 7 and the inlet-port $7^a$, said inner chamber and port being in open communication with the inlet-port of the turbine. The stem 9 of the valve 8 is provided with a piston 10, fitted to operate in a cylinder 11, above which is a chamber 12, containing a coil-spring 13, which acts normally to hold the valve 8 to its seat. The chamber 12 is in communication with the chamber 7 by means of a small hole 14, so that the steam may gradually leak through into the chamber 12, and thus equalize the pressures upon the two ends of the piston 10. The chamber 12 is also connected with a pipe or conduit 15, which may be provided with a hand-operated throttle-valve 16, and which terminates in a small annular chamber 17 in a casting 18. A cylindrical bushing 19 is located in the casting 18 and is provided with ports 20, which open into the annular chamber 17, and with ports 21, which open into a chamber 22 in the casting, which is provided with an exhaust pipe or conduit 23. The bushing 19 is provided with a piston-valve 24, having an intermediate portion 25 of reduced diameter and of such length that the ports 21 are always open. Between the reduced portion 25 and the portion that normally closes the ports 20 the opposite sides are beveled, as indicated at 26, so as to insure a gradual opening of the ports 20.

The valve 24 is connected to the reciprocating sleeve 27 of a fly-ball governor 28, which may be either the main governor of the engine or a special governor for this valve. As here shown, however, it is utilized for controlling both the speed of the turbine and the valve 24, the lever 29 and link 30 being employed for connecting the governor to a regulating-valve 33 in the usual manner, so that an increase of speed causing the governor-balls 31 to fly outward will effect a closing movement of the regulating-valve, and vice versa.

It will be understood that the main regulating-valve, which is operated by the lever 29 and the link 30, is capable of sufficient movement beyond that necessary for supplying full pressure to the inlet end of the turbine to permit movement of the governor-balls inwardly to a position beyond that which corresponds to normal maximum load.

When the engine is running at normal speed and under full load, the governor-balls 31 will be in substantially the positions indicated in the drawings, and if the load increases so as to decrease the speed the balls will move inward toward the governor-shaft 32, and thus lower the valve 24 sufficiently to partially open the ports 20, and thus permit a slight flow of steam from the chamber 12 through the pipe 15, chamber 17, ports 20 and 21, chamber 22, and exhaust-pipe 23. This action correspondingly reduces the pressure in the chamber 12, and thus permits the pressure in the chamber 7 to open the valve 8 slightly, and thus supply steam through the pipe 4 to the intermediate point of the turbine. A further movement of the valve 24 will serve to produce a further fall of pressure behind the piston 10, and thus insure further movement of the valve 8 against the pressure of the spring 13, which assists in making the valve movement steady and uniform.

In case the valve 24 opens to its full extent substantially atmospheric pressure will be produced in the chamber 12, since the hole 14 is so small that the leakage through it takes place slowly, and consequently the valve 8 will be opened to its full extent.

While my invention is primarily intended for use in connection with the automatic regulation of steam-turbines, it is my intention to include within its scope both non-automatic and partially-automatic mechanism, in so far as there may be a demand therefor in connection with the control of a fluid-pressure supply to any machine or apparatus. It will be also understood that the apparatus may be so constructed and arranged that the main valve shall be normally held to its seat by unbalanced fluid-pressures and be moved from its seat by a spring or equivalent means when the fluid-pressure at the side having the greater area is relieved by means of the auxiliary valve, such operation being substantially a reversal of that already described.

The form, location and relative arrangement of the valves and connecting and operating means may also be otherwise varied within considerable limits without departing from the invention, as will be readily understood by those skilled in the art.

I claim as my invention:

1. In an engine, the combination with a main valve, a spring tending to hold it to its seat and means for subjecting it to normally balanced fluid-pressures, of a normally closed auxiliary valve and a governor connected to said auxiliary valve and actuating the same to exhaust the fluid-pressure which supplements the action of the spring upon the main valve when more steam is required by the engine.

2. The combination with a main valve having a piston and a casing having chambers at the respective ends of the piston between which is a small leakage-passage that is always open, of a spring acting upon said piston and tending to hold the valve to its seat and an automatically-acting auxiliary valve for reducing the fluid-pressure which supplements the action of the spring.

3. The combination with a main valve having a casing provided with two chambers connected by a permanently-open restricted passage and the fluid-pressures in which act in opposite directions upon the valve, of a spring acting in conjunction with the fluid-pressure in one of said chambers and an auxiliary valve for relieving the pressure which acts in conjunction with said spring.

4. The combination with a valve and a casing having two chambers connected by a restricted but always-open passage and within which fluid-pressure acts in opposite directions upon the valve, of an auxiliary valve for relieving the pressure which tends to hold the main valve to its seat and means for automatically opening the auxiliary valve when the demand for fluid-pressure from the source controlled by the main valve attains a predetermined value.

5. The combination with a valve embodying or provided with a piston, a casing having two chambers connected by a restricted but always-open passage and a cylinder for the said piston, of a spring tending to hold the valve to its seat and an auxiliary valve the opening of which relieves the fluid-pressure which acts in the cylinder and in the chamber communicating with or forming a part thereof to supplement the action of the spring.

6. In an engine, the combination with a main valve embodying or provided with a piston, a casing having two chambers connected by a restricted passage, one of which is an extension of the cylinder for said piston, and a spring tending to hold the valve to its seat, of an auxiliary valve, an engine-governor and connections between said auxiliary valve and said governor whereby the exhaust-passage from the cylinder is opened and closed in accordance with the demand of the engine.

7. The combination with a steam-turbine having an inlet-port at one end and an exhaust-port at the other and provided with a steam-conduit leading to an intermediate point, of a normally seated valve in said conduit, a casing for said valve having two chambers connected by a restricted passage and containing steam which acts in opposite directions upon the valve, of an exhaust-valve for the chamber in which the steam acts in a direction tending to close the main valve, a speed-governor and connections between said governor and the exhaust-valve.

8. The combination with a steam-turbine provided with a steam-conduit leading to a point between its main inlet and exhaust ports and a normally seated valve in said conduit, of an auxiliary governing-valve for said main valve, a speed-governor and connections between said speed-governor and said governing-valve whereby the opening and closing of said main valve is dependent upon the speed of the engine.

9. The combination with a steam-turbine, a steam-conduit connected to a point between the inlet and exhaust ports of the turbine and a valve in said conduit which is normally subjected to oppositely-acting bodies of steam under pressure, of a controlling-valve for partially or wholly exhausting the body of steam which tends to hold the valve closed, a governor and connections between the same and the controlling-valve and operating to open said controlling-valve when the speed of the engine falls below a predetermined limit.

10. The combination with a steam- turbine provided with a steam-conduit leading to a point between its main inlet and exhaust ports, of a valve in said conduit, a casing for said valve comprising two chambers connected by a restricted passage and normally containing steam under pressure which acts in opposite directions upon the valve, a controlling-valve for exhausting steam-pressure from the chamber in which the steam tends to close the valve and means for automatically opening the controlling-valve when the speed of the engine falls below a predetermined limit.

11. The combination with a steam-turbine provided with a steam-conduit connected to the engine at a point between the main inlet and exhaust ports and a valve in said conduit subjected to oppositely - acting bodies of steam having a limited communication each with the other, of a controlling piston-valve for exhausting the body of steam which tends to hold the main valve closed and provided with beveled operating-surfaces whereby its movement with reference to the exhaust-port tends to gradually open or close said port.

12. In a turbine, a fluid inlet to the high pressure stage, a supplemental fluid inlet to an intermediate stage, independently operating valves regulating said inlets and means dependent on the turbine speed whereby said valves are automatically controlled.

13. In a turbine, a main fluid inlet at the high pressure end, a valve controlling said inlet, a high pressure inlet intermediate of the main fluid inlet and the low pressure end, a valve controlling said inlet, a speed governor and means between said governor and said valves whereby the operations of said valves are independently and automatically controlled by said governor.

14. In a turbine, a main fluid inlet at the high pressure end, a supplemental fluid inlet nearer the low pressure end, a valve between the main inlet and the supplemental inlet for controlling the latter inlet, a valve controlling the fluid admitted to the main inlet and that passing the valve for the supplemental inlet, a governor and means dependent thereon for automatically operating said valves independently.

15. A turbine having a main valved inlet at the high pressure end, a supplemental valved inlet nearer the low pressure end and means for automatically controlling the valves in said inlets independently.

16. In a turbine, a main fluid inlet at the high pressure end, a valve controlling said inlet, a supplemental fluid inlet intermediate of the main fluid inlet and the low pressure end, a fluid actuated valve controlling said latter inlet and means for automatically governing the operations of both of said valves.

17. A fluid-pressure turbine and in combination, a pressure-chest, a conduit leading therefrom to an intermediate part of the turbine and a valve in the chest controlling the said conduit said valve having an opening therethrough allowing communication between the said pressure-chest and the end of the turbine, substantially as described.

18. A turbine having a plurality of pressure inlet passages disposed at different stages whereby the fluid pressure may be introduced at different points and means for automatically controlling the passing of the working fluid through said passages.

19. A turbine having a main inlet at the high pressure end and a supplemental inlet nearer the low pressure end with means for automatically controlling the latter inlet.

20. In combination with an elastic fluid turbine wheel, a device for controlling the admission of live working fluid to the inlet of said wheel, a device for controlling the admission of live working fluid to the outlet of said wheel and means controlled by said wheel for operating said devices to vary the steam pressure exerted by said fluid respectively on the opposite sides of said wheel, substantially as described.

21. In combination with an elastic fluid turbine wheel, means for admitting live working fluid simultaneously to both sides of said wheel, and a device governed by the speed of said wheel for regulating the admission of said fluid to the exhaust side of said wheel, substantially as described.

22. In combination with an elastic fluid turbine wheel and its inclosing casing, a valve for admitting live working fluid to the inlet side of said wheel, a valve for admitting live working fluid to the exhaust side of said wheel, and means controlled by said wheels for governing the said valves, substantially as described.

23. In combination with an elastic fluid turbine wheel and its inclosing casing, a valve for admitting fluid to the inlet of said wheel, a valve for admitting fluid to said casing on the exhaust side of said wheel, and means controlled by said wheel for governing said valves, the said means being constructed and arranged to throttle the valve communicating with the exhaust side prior to throttling said inlet valve, substantially as described.

In testimony whereof, I have hereunto subscribed my name this 1st day of October, 1904.

FRANCIS HODGKINSON.

Witnesses:
DAVID WILLIAMS,
JNO. S. GREEN.